United States Patent [19]

Nagashima et al.

[11] Patent Number: 5,734,158

[45] Date of Patent: Mar. 31, 1998

[54] LCD PANEL TEST APPARATUS

[75] Inventors: Teruhiko Nagashima, Kounosu; Hiroyuki Aoki, Gyoda, both of Japan

[73] Assignee: Advantest Corp., Tokyo, Japan

[21] Appl. No.: 638,943

[22] Filed: Apr. 24, 1996

[30] Foreign Application Priority Data

Apr. 24, 1995 [JP] Japan .................. 7-123174

[51] Int. Cl.[6] .................. G01R 31/00; G01R 31/308
[52] U.S. Cl. .................. 250/225; 324/770; 324/753
[58] Field of Search .................. 250/225, 216; 324/770, 537, 752, 753, 763, 96; 356/364, 366, 367, 368, 370, 72, 73, 432, 434, 435, 441, 442

[56] References Cited

U.S. PATENT DOCUMENTS

| 4,983,911 | 1/1991 | Henley | 324/158 |
| 5,235,272 | 8/1993 | Henley | 324/158 |
| 5,444,385 | 8/1995 | Henley | 324/752 |
| 5,459,410 | 10/1995 | Henley | 324/770 |
| 5,614,839 | 3/1997 | Bosacchi | 324/770 |

Primary Examiner—Edward P. Westin
Assistant Examiner—John R. Lee
Attorney, Agent, or Firm—Muramatsu & Associates

[57] ABSTRACT

An LCD panel test apparatus automatically detects defects of the LCD panel under test. The LCD panel test apparatus includes: a first polarizing plate provided above said LCD panel under test and having a predetermined polarizing direction; a second polarizing plate provided below the LCD panel having a polarizing direction perpendicular to that of the first polarizing plate; a back light provided under the second polarizing plate to illuminate the LCD panel; a camera to monitor light signals passing through the first polarizing plate; a third polarizing plate mounted on the same horizontal plane of the first polarizing plate; a polarizing plate driver for driving the first and third polarizing plates to place either one of the first or third polarizing plate right above the LCD; an analog-digital converter to convert an analog signal from the camera into digital data; an image processing CPU which performs a signal processes for the digital data received from the analog-digital converter; and an LCD panel driver which provides a drive signal to the LCD panel.

7 Claims, 3 Drawing Sheets

5,734,158

LCD PANEL TEST APPARATUS

Field of the Invention

This invention relates to an apparatus for testing an LCD (liquid crystal display) panel, and more particularly, to an apparatus for automatically testing an LCD panel to find out defects of the LCD panel by providing a mechanism for changing or rotating polarizing plates.

Background of the Invention

In testing an LCD (liquid crystal display) panel to find out defects such as display unevenness, an apparatus as shown in FIG. 2 has been used for the various test methods described below.

The conventional apparatus of FIG. 2 includes a polarizing plate 11 provided above the LCD panel 10 to be tested, a polarizing plate 12 provided below the LCD panel 10, a back light 13 provided under the polarizing plate 12 and a camera 16 to monitor light signals passing through the polarizing plate 11.

The LCD test apparatus further includes an analog-digital converter 17 to convert an analog signal from the camera 16 into digital data, an image processing CPU 20 which performs a signal processing for the digital data from the analog-digital converter 17, an LCD pattern generator 18 to generate a display pattern for the LCD panel 10 to be tested, an LCD panel driver 15 which provides a drive signal based on the display pattern to drive the LCD panel 10 to be tested through contact units 14.

The directions of polarization in the polarizing plates 11 and 12 are arranged to be perpendicular with each other so that the light from the back light 13 will not reach the camera 16 when the LCD panel 10 is not inserted between the polarizing plates 11 and 12. When the LCD panel 10 is placed between the polarizing plates 11 and 12, the light beams from the polarizing plate 12 may be changed their directions by the crystals aligned in the LCD panel.

Thus, in one test method, when the LCD is not driven by the LCD driver 15 and the LCD panel is uniform, the light beams from the polarizing plate 12 may be uniformly polarized by the LCD panel 10. As a result, the image obtained by the camera 16 for the LCD panel should be uniform. However, when the LCD panel 10 has defects such as unevenness of orientations of the liquid crystals in the LCD panel, the light beams are nonuniformly affected by the LCD panel. Thus, the light beams reaching the camera 16 incorporate such effects caused by the defects of the LCD panel 10.

Thus, without driving the LCD panel, the camera 16 obtains an intensity image of the LCD panel 10 propagated through the polarizing plate 11. The analog-voltage converter 17 converts the analog data obtained by the camera 16 into digital data so that the CPU 20 can perform a signal processing for the image data. Such signal processing includes an averaging process for determining an average intensity of the light beams received by the camera 16 and a process of determining the intensity difference from the average intensity in each display area.

In the other method of testing the LCD panel, the LCD panel is driven by the LCD panel driver 15 through the contact unit 14. The LCD panel 10 is set to all white or all black state by the drive signals applied to the contact unit 14. In this situation, all of the crystals in the LCD panel 10 are aligned in the same direction, i.e., a vertical direction in which the light beams are not polarized. Thus, the back light will not reach the camera 16 because of the 90 degrees polarization angle between the plates 11 and 12.

However, when the LCD panel 10 has a display nonuniformity, i.e., the orientations of some crystals are not the same as the other, the light beams in the area suffer the polarization and reach the camera 16 through the plate 11. Thus, by observing the intensity map obtained by the camera 16 and providing the signal processing by the CPU 20, the display defects of the LCD panel may be located.

In the further method of testing the LCD panel, a manual and visual inspection is used to find out a defect which could not be located by the automatic test methods described in the foregoing. In this method, the LCD panel 10 is not excited by the external voltage and is placed between the polarizing plates 11 and 12 as in the first method. It is known that when rotating the polarizing plate 11, there is a point of the rotation angle where the defects of the LCD panel are more easily observable.

Therefore, in the conventional process of testing the LCD panels, the above mentioned first and second tests are automatically performed first, and then the manual and visual inspection is performed without driving the LCD panel while applying a certain angle of rotation in the polarizing plate 11. However, in the conventional LCD panel test methods, the above noted visual inspection is performed manually but not automatically.

SUMMARY OF THE INVENTION

Therefore, it is an object of the present invention to provide an LCD panel test apparatus which is capable of automatically testing an LCD panel to find out display defects of the display panel.

It is another object of the present invention to provide an LCD panel test apparatus which is capable of automatically testing an LCD panel while replacing one polarizing plate with another polarizing plate to more closely study display defects of the panel.

It is a further object of the present invention to provide an LCD panel test apparatus which is capable of automatically testing an LCD panel while rotating one or more polarizing plates with respect to the LCD panel to find out display defects of the panel.

It is a further object of the present invention to provide an LCD panel test apparatus which is capable of testing an LCD panel with high efficiency without subjecting to reading errors of a user.

In the present invention, the LCD panel test apparatus is automatically identify the defects of the LCD panel by including a mechanism for replacing one polarizing plate with another and providing rotations for the polarizing plate.

The LCD panel test apparatus of the present invention includes: a first polarizing plate provided above a LCD panel under test and having a predetermined polarizing direction; a second polarizing plate provided below the LCD panel under test and having a polarizing direction perpendicular to that of the first polarizing plate; a back light provided under the second polarizing plate to illuminate the LCD panel under test; a camera to monitor light signals passing through the first polarizing plate; a third polarizing plate mounted on the same horizontal plane of the first polarizing plate and having a predetermined polarizing direction suitable for finding a specific defect of the LCD panel under test; a polarizing plate driver for driving the first and third polarizing plates to place either one of the first or third polarizing plate right above the LCD panel under test; an analog-digital converter to convert an analog signal from the camera into digital data; an image processing CPU which performs a signal processes for the digital data received from the analog-digital converter; and an LCD panel driver which provides a drive signal to the LCD panel under test.

According to the present invention, the LCD panel test apparatus is capable of automatically testing an LCD panel to find out display defects of the LCD panel. The LCD panel test apparatus of the present invention is capable of automatically testing an LCD panel while replacing one polarizing plate with other polarizing plate to detect the display defects of the LCD panel which are relatively difficult to be located.

According to the present invention, the LCD panel test apparatus is capable of automatically testing an LCD panel while rotating one or more polarizing plates with respect to the LCD panel to find out display defects of the panel which are not easily identifiable in the conventional automatic test method. Thus, the LCD panel test apparatus can test the LCD panel with high efficiency and reliability without subjecting to reading errors of a user.

DETAILED DESCRIPTION OF THE PREFERRED EMBODIMENT

Figure 1:
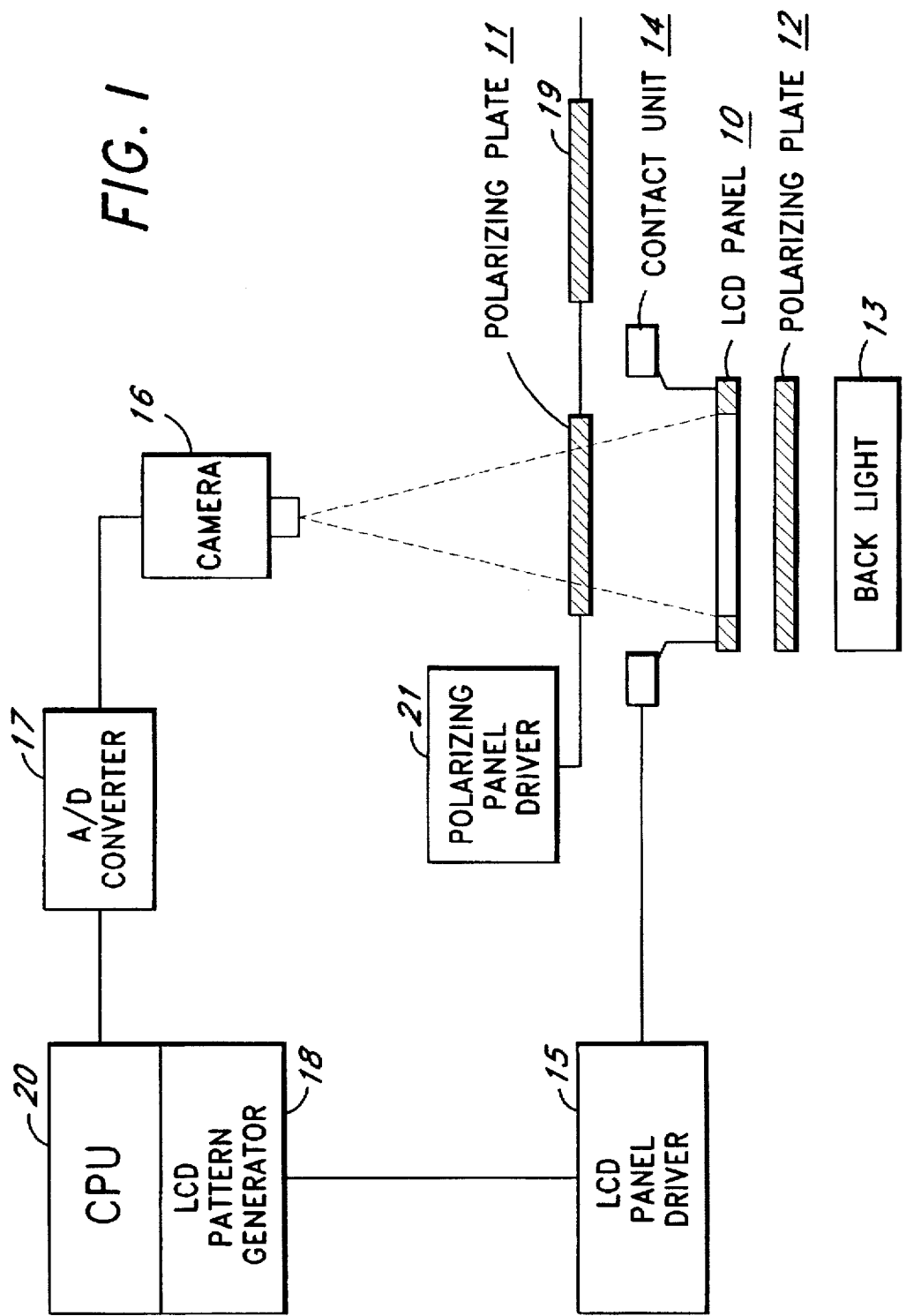
FIG. 1 is a block diagram showing a structure of the LCD panel test apparatus of the present invention.
Figure 2:
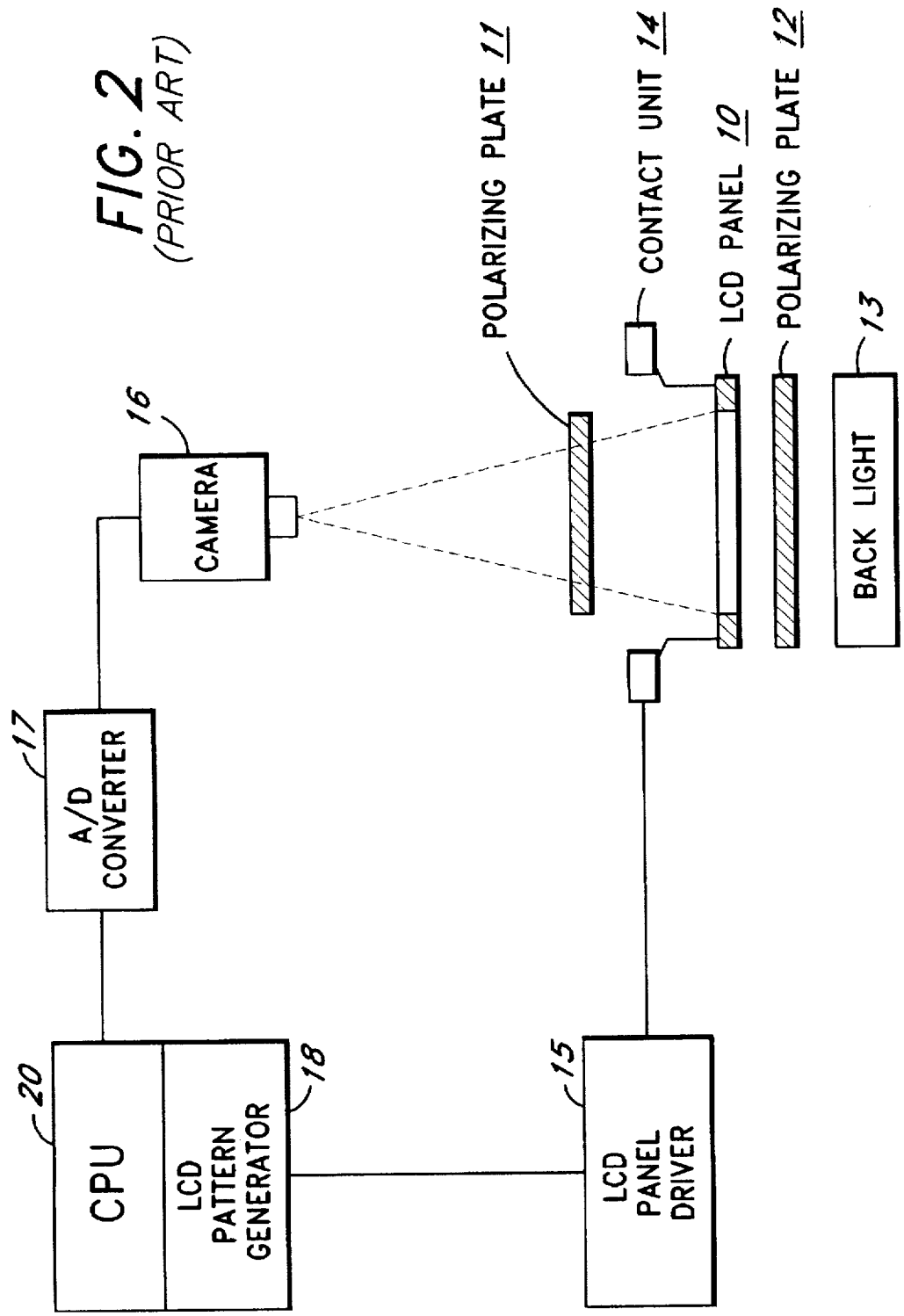
FIG. 2 is a block diagram showing a structure of the LCD panel test apparatus of the conventional example.

FIG. 1 shows an embodiment of LCD panel test apparatus of the present invention. In FIG. 1, the LCD panel test apparatus includes a polarizing plate 11 provided above the LCD panel 10 to be tested, a polarizing plate 12 provided below the LCD panel 10, a back light 13 provided under the polarizing plate 12, a camera 16 to monitor light signals passing through the polarizing plate 11, a polarizing plate 19 mounted on the same plane of the plate 11, and a polarizing plate driver 21.

The LCD test apparatus further includes an analog-digital converter 17 to convert an analog signal from the camera 16 into digital data, an image processing CPU 20 which data processes the digital data from the analog-digital converter 17, an LCD pattern generator 18 to generate a display pattern for the LCD panel 10 to be tested, and an LCD panel driver 15 which provides a drive signal to drive the LCD panel 10 to be tested through contact units 14.

The directions of polarization in the polarizing plates 11 and 12 are arranged to be perpendicular with each other so the light from the back light 13 will not reach the camera 16 when the LCD panel 10 is not inserted between the polarizing plates 11 and 12. When the LCD panel 10 is placed between the polarizing plates 11 and 12, the light beams from the polarizing plate 12 may be changed their directions by the crystals aligned in the LCD panel.

Thus, when the LCD panel 10 is placed between the polarizing plates 11 and 12, and the LCD panel 10 has no display defects, the light beams from the polarizing plate 12 may be uniformly polarized by the LCD panel ! 0. As a result, the image obtained by the camera 16 for the LCD panel should be uniform. However, when the LCD panel 10 has defects such as unevenness of orientations of the liquid crystals in the LCD panel, the light beams are nonuniformly affected by the LCD panel. Thus, the light beams reaching the camera 16 incorporate such effect caused by the defects of the LCD panel 10.

Thus, without driving the LCD panel, the camera 16 obtains an intensity image of the LCD panel 10 propagated through the polarizing plate 11. The analog-voltage converter 17 converts the analog data obtained by the camera 16 into digital data so that the CPU 20 can perform a signal processing for the image data. Such signal processing includes an averaging process for determining an average intensity of the light beams received by the camera 16 and a process of determining the intensity difference from the average intensity in each display area.

In the other test method, the LCD panel is driven by the LCD panel driver 15 through the contact unit 14. The LCD panel 10 is set to all white or all black state by the drive signals applied to the contact unit 14. In this situation, all of the crystals in the LCD panel 10 are aligned in the same direction, i.e., a vertical direction in which the light beams are not polarized. Thus, the back light will not reach the camera 16 because of the 90 degrees polarization angle between the plates 11 and 12.

However, when the LCD panel 10 has a display nonuniformity, i.e., the orientations of some crystals are not the same as the other, the light beams in the area suffer the polarization and reach the camera 16 through the plate 11. Thus, by observing the intensity map obtained by the camera 16 and providing the signal processing by the CPU 20, the display defects of the LCD panel may be located.

Some defects on the LCD panel are not easily identifiable by the above test procedures. Such defects include a gap defect in which a foreign substance causes a difference in the thickness of the LCD layer or an alignment defect in which crystals are not uniformly aligned in a certain location of the LCD panel. Thus, the next test is performed by replace the polarizing plate 11 with the polarizing plate 19 by the polarizing plate driver 21. For example, the polarizing plate driver 21 provides a slide movement to the polarizing plates 11 and 19 in the horizontal direction so that the plates 11 and 19 change the position with each other.

Figure 3:
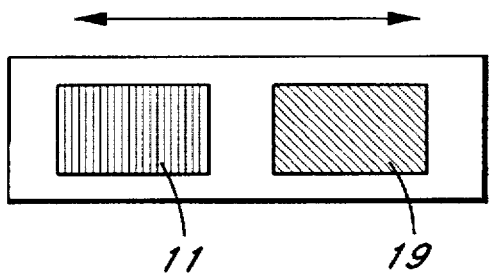
FIG. 3 is a schematic plan view showing two polarizing plates slidably arranged to replace with one another according to the present invention.

The polarizing plate 19 is arranged its polarizing direction to easily identify display defects, such as disciple nonuniformity, of the specific type of LCD panel under test. The polarizing direction of the plate 19 may be determined through an experiment for the type of LCD panel to be tested. Thus, by positioning the specially arranged polarizing plate 19, the defects of the LCD panel 10 may be effectively located. FIG. 3 illustrates a situation where the two polarizing plates slide in the horizontal direction to change position with each other.

Figure 4:
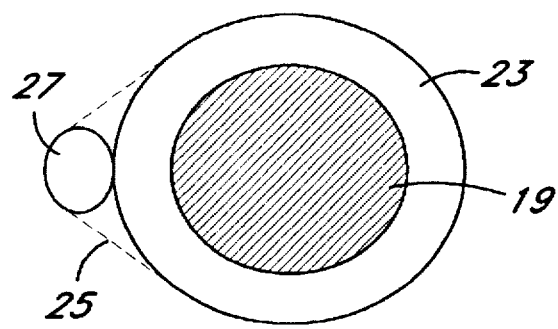
FIG. 4 is a schematic plan view showing an example of rotating a polarizing plate above the LCD panel to be tested.

In the further preferred embodiment, as shown in FIG. 4, the polarizing plate 19 is also arranged on a rotation mechanism so that the plate 19 horizontally rotates above the LCD panel 10 under test. In the example of FIG. 4, the polarizing plate 19 is mounted on a turn table 23 which is driven by a motor 27 through a belt 25. Thus, the polarizing plate 19 and the rotation mechanism may be slidably placed on a horizonal plane as in FIG. 3, the polarizing plate 11 can be automatically replaces with the polarizing plate 19 which further rotates above the LCD panel 10.

Figure 5:
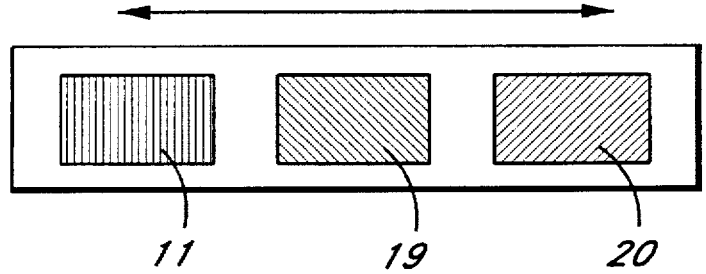
FIG. 5 is a schematic plan view showing three polarizing plates slidably arranged to replace with one another according to the present invention.
Figure 6:
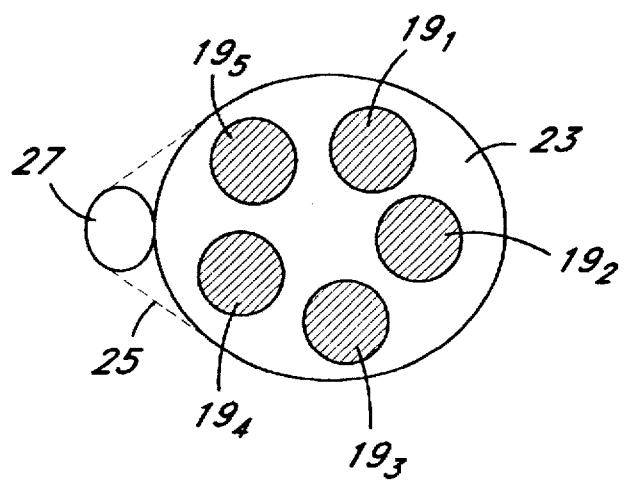
FIG. 6 is a schematic plan view showing an example of rotating a plurality of polarizing plates above the LCD panel to be tested.

FIG. 5 hows another embodiment wherein three polarizing plates 11, 19 and 20 are slidably provided on the horizontal plane. The polarizing plate 20 may be arranged to have other polarizing direction to be suitable for specific defects of the LCD panel or specific type of LCD panel to be tested. FIG. 6 shows a further embodiment which has a plurality of polarizing plates $19_1$–$19_5$ on the turn table 23. This arrangement further improves the test efficiency and flexibility.

As has been described in the foregoing, according to the present invention, the LCD panel test apparatus is capable of automatically testing an LCD panel to find out display defects of the LCD panel. The LCD panel test apparatus of the present invention is capable of automatically testing an LCD panel while replacing one polarizing plate with other polarizing plate to detect the display defects of the LCD panel which are relatively difficult to be located.

According to the present invention, the LCD panel test apparatus is capable of automatically testing an LCD panel while rotating one or more polarizing plates with respect to the LCD panel to find out display defects of the panel which are not easily identifiable in the conventional automatic test method. Thus, the LCD panel test apparatus can test the LCD panel with high efficiency and reliability without subjecting to reading errors of an operator.

What is claimed is:

1. An LCD panel test apparatus for automatically testing a liquid crystal display (LCD) panel, comprising:

a first polarizing plate provided above a LCD panel under test and having a predetermined polarizing direction;

a second polarizing plate provided below said LCD panel nuder test and having a polarizing direction perpendicular to that of said first polarizing plate;

a back light provided under said second polarizing plate to illuminate said LCD panel under test;

a camera to monitor light signals passing through said first polarizing plate;

a third polarizing plate mounted on the same horizontal plane of said first polarizing plate and having a predetermined polarizing direction suitable for finding a specific defect of said LCD panel under test;

a polarizing plate driver for driving said first and third polarizing plates to place either one of said first or third polarizing plate right above said LCD panel under test;

an analog-digital converter to convert an analog signal from said camera into digital data;

an image processing CPU which performs a signal processes for said digital data received from said analog-digital converter; and an LCD panel driver which provides a drive signal to said LCD panel under test.

2. An LCD panel test apparatus as defined in claim 1, wherein said polarizing plate driver slidably drives said first and third polarizing plates to select one of said first or third polarizing plate.

3. An LCD panel test apparatus as defined in claim 1, wherein said polarizing plate driver rotates said third polarizing plate over said LCD panel under test.

4. An LCD panel test apparatus as defined in claim 1, wherein said polarizing plate driver slidably drives said first and third polarizing plates to position said third polarizing plate over said LCD panel and horizontally rotates said third polarizing plate.

5. An LCD panel test apparatus as defined in claim 1, wherein said third polarizing plate is formed of two or more differently polarized plates.

6. An LCD panel test apparatus as defined in claim 1, further includes an LCD pattern generator for providing a display pattern to said LCD panel under test through said LCD panel driver to display the pattern on the screen of said LCD panel under test.

7. An LCD panel test apparatus as defined in claim 4, wherein said third polarizing plate is formed of two or more differently polarized plates.

* * * * *